July 5, 1960  J. V. OLIVEAU  2,944,125
PRESSURE ACTUATED ELECTRIC SWITCH
Filed June 27, 1958
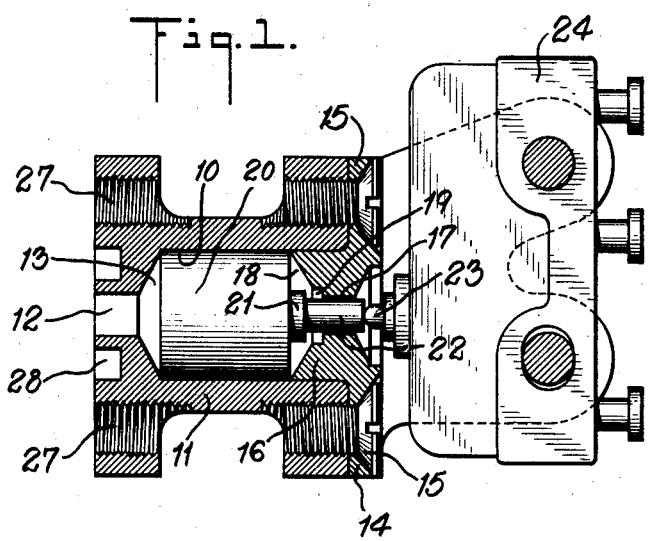
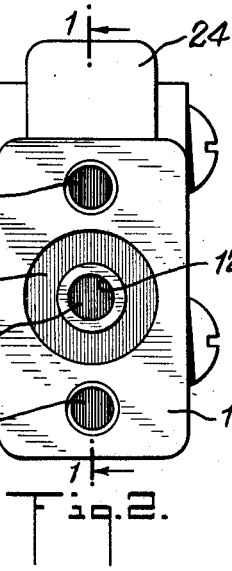
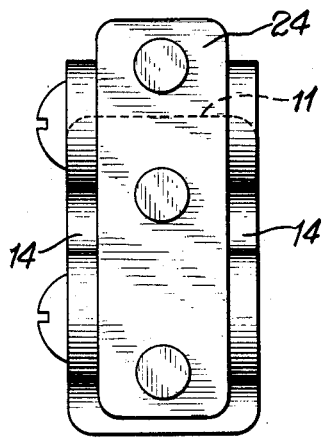
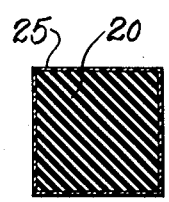
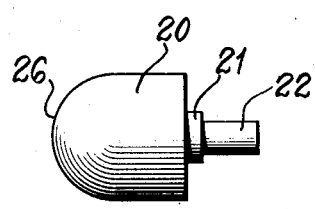
INVENTOR.
JOHN V. OLIVEAU
BY
*Benj. T. Rauber*
ATTORNEY

United States Patent Office 2,944,125
Patented July 5, 1960

2,944,125

PRESSURE ACTUATED ELECTRIC SWITCH

John V. Oliveau, Greenwich, Conn., assignor to The Aerotec Industries, Inc., a corporation of Connecticut Filed June 27, 1958, Ser. No. 745,041

7 Claims. (Cl. 200—82)

My invention relates to a pressure actuated electric switch and to a pressure actuator for electric switches and other apparatus. More particularly the invention relates to a pressure actuator of a minimum size and weight and capable of withstanding high pressures without leakage.

In my invention fluid under pressure is admitted through an inlet to one end of a cylindrical chamber, the opposite end of which is provided with a cavity preferably of hemispherical or conical form, and acts on one end of a block of an elastomer tightly fitting the cylindrical surface of the chamber, the opposite end of the block being clear of the bottom of the cavity. The elastomer is a resilient, organic polymer such as a vulcanized compounded natural or synthetic rubber which is deformed under the pressure of the fluid into the cavity. The end of the block facing the cavity abuts a movable member, such as a stem extending through and freely slidable in an opening or passage in the end of the housing. The block of elastomer is distorted by the pressure in proportion to the pressure of the fluid and moves the stem proportionately to the pressure. When the pressure is released, the block resumes its unstressed position and the member resumes its original position. The elastomer is incompressible and the fluid pressure forces the contacting cylindrical surfaces of the block and chamber with a pressure that increases with the fluid pressure and makes the seal between them tighter.

The movable member or stem may actuate any apparatus or control to be actuated by pressure. It is particularly suitable to actuate an electric switch. The pressure actuator may be used to operate at relatively low pressures and may be protected against destructive higher pressures by providing the stem with a disc or flange at the end abutting the end of the block of elastomer which may come to rest in the bottom of the cavity or in a recess therein so that when the proper limit of travel is reached the cavity is closed against further flow of the elastomer into the passage in which the stem moves, which might injure the mechanism of the switch or other mechanism to be actuated.

By proper selection of the block of elastomer and therefore the area in contact with the pressure fluid and proper selection of the durometer hardness of the rubber or other elastomer, response at a selected pressure may be obtained. Elastomers of the silicone group may be used for the block when the actuator is to be used at high temperatures. When an elastomer is to be used under conditions where it might be subjected to destructive media it may be encased in a protective covering such as a jacket of "Teflon." Further, for improved performance and sealing characteristics, the pressure end of the block may be rounded or of convex hemispherical shape, the convex surface facing the pressure fluid. The pressure would tend to flatten this face and therefore improve the sealing at the edge of this face.

The various features of my invention are illustrated by way of example in the accompanying drawings, in which;

Fig. 1 is a longitudinal section of an actuator embodying my invention and a side view of an electric switch actuated thereby, the section through the actuator being taken on the line 1—1 of Fig. 2, Fig. 2 is an end view of the actuator taken from the left of Fig. 1, Fig. 3 is an end view of the assembly taken from the right of Fig. 1, Fig. 4 is a longitudinal section of an elastomer block having a protective jacket, and Fig. 5 is a side view of an elastomer block having a hemispherical pressure end and an actuator stem abutting the other end of the block.

In the embodiment illustrated, a cylindrical chamber 10 is formed in a housing 11. The chamber is closed at the left end and an inlet 12 is provided for the entrance of pressure fluid. Preferably the end surface of the closed end of the cylinder is recessed in a conical surface to form an entrance space 13. The opposite, open, end of the cylindrical chamber is closed by a plate 14 secured to the wall of the housing by screws 15. The plate 14 has a projection 16 extending into the open end of the chamber and closely fitting the cylindrical surface to close the chamber. This projection has a longitudinal opening 17. The inner end of the projection 16 is recessed at 18, the surface of the recess being conical. Surrounding the opening 17 at the base of the recess is a small recess 19.

A cylindrical block 20 of elastomeric material of a diameter equal to that of the chamber 10 is placed in the chamber between the inner edges of the ends of the chamber. The block 20 tightly fits the inner surface of the chamber. When fluid under pressure is admitted to the chamber through the inlet 12 it tends to distort the block 20 toward the opposite end of the cylinder into the cavity 18.

The distortion of the block into the cavity 20 acts on a flange or disc 21 of a stem 22 slidable in the opening 17 to move this stem axially of the cylinder and to engage and move an actuating pin 23 of a microswitch 24 mounted on the closing plate 14 and thus operate the switch.

The pressure of the fluid acting on the pressure end of the block 20 not only distorts the block to flow into the recess 18 but also presses it more tightly to the cylindrical surface of the chamber 10 and thus seals the block the more tightly the higher the pressure. The block preferably has a substantial length to provide an effective sealing contact with the cylindrical wall of the chamber, the length in the example illustrated being about equal to the diameter of the block.

When the elastomeric composition is to be subjected to a fluid medium that may attack the composition the block may be provided with an enclosing jacket 25 of highly resistant material such as the hydrocarbon fluoride polymer known in the art as "Teflon," as shown in Fig. 4.

In the modification shown in Fig. 5, the pressure end of the block is rounded convexly as shown at 26 in Fig. 5 to improve the sealing of the block to the chamber.

A connection for the supply of fluid under pressure to the inlet 12 may be secured to the inlet end of the chamber by screws for which the threaded screw holes 27 are provided and may be sealed fluid-tightly to the end of the housing by gaskets placed in a cylindrical recess 28.

The above described actuator has no moving parts except the stem 22, the block 20 being stationary except for its distortion and recovery. It may be made of very small size as, for example about an inch in length and diameter and is particularly suitable for aircraft and missile use as well as for other purposes.

Having described my invention, I claim:

1. A pressure actuator which comprises a housing having a cylindrical chamber and having an inlet at one end of said chamber and an axial passage from the opposite end of said chamber, a cylindrical block of resilient elastomer fitting the cylindrical surface of said chamber between said ends and supported at its perimeter at the end of said cylinder having said passage and spaced from said passage inwardly of its perimeter to be distorted toward said passage by pressure fluid admitted through said inlet and a movable element extending through said passage to be moved longitudinally by said block of elastomer when distorted by said fluid pressure.

2. The pressure actuator of claim 1 in which said elastomer is rubber.

3. The pressure actuator of claim 1 in which said moving element has a stop to abut the top of said passage upon a limited distortion of said block of resilient elastomer.

4. The pressure actuator of claim 1 in which said block of resilient elastomer has an enclosing shell of resilient material more resistant to chemical action.

5. The pressure actuator of claim 1 in which the end of said block of resilient elastomer is rounded convexly toward said inlet.

6. The pressure actuator of claim 1 in which said movable element is a stem extending axially and movable axially in said passage.

7. The pressure actuator of claim 6 having a disc at the end of said stem abutting said block of resilient elastomer to limit movement of said stem.

References Cited in the file of this patent

UNITED STATES PATENTS

| | | |
|---|---|---|
| 2,260,636 | Neff | Oct. 28, 1941 |
| 2,275,556 | Rasmussen | Mar. 10, 1942 |
| 2,430,428 | Katcher | Nov. 4, 1947 |
| 2,777,029 | Langstroth | Jan. 8, 1957 |
| 2,817,727 | Schmeling | Dec. 24, 1957 |
| 2,836,671 | Langstroth | May 27, 1958 |

UNITED STATES PATENT OFFICE

CERTIFICATE OF CORRECTION

Patent No. 2,944,125                         July 5, 1960

John V. Oliveau

It is hereby certified that error appears in the above numbered patent requiring correction and that the said Letters Patent should read as corrected below.

In the grant, lines 2 and 12, and in the heading to the printed specification, lines 3 and 4, name of assignee, for "The Aerotec Industries, Inc.", each occurrence, read -- Aerotec Industries, Inc. --.

Signed and sealed this 10th day of January 1961.

(SEAL)
Attest:

KARL H. AXLINE
Attesting Officer

ROBERT C. WATSON
Commissioner of Patents